(12) United States Patent
Hallberg

(10) Patent No.: US 9,846,040 B2
(45) Date of Patent: Dec. 19, 2017

(54) SYSTEM AND METHOD FOR DETERMINING THE ORIENTATION OF AN INERTIAL MEASUREMENT UNIT (IMU)

(71) Applicant: Sharp Laboratories of America (SLA), Inc., Camas, WA (US)

(72) Inventor: Bryan Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 111 days.

(21) Appl. No.: 14/873,946

(22) Filed: Oct. 2, 2015

(65) Prior Publication Data

US 2016/0327396 A1    Nov. 10, 2016

Related U.S. Application Data

(63) Continuation-in-part of application No. 14/742,852, filed on Jun. 18, 2015, and a continuation-in-part of application No. 14/707,194, filed on May 8, 2015, now Pat. No. 9,450,681.

(51) Int. Cl.
    *G01C 21/16* (2006.01)

(52) U.S. Cl.
    CPC .......... *G01C 21/165* (2013.01); *G01C 21/16* (2013.01)

(58) Field of Classification Search
    CPC .................. G01C 21/165; G01C 21/16
    See application file for complete search history.

(56) References Cited

U.S. PATENT DOCUMENTS

| | | | |
|---|---|---|---|
| 6,377,906 B1* | 4/2002 | Rowe | G01C 21/16 244/164 |
| 9,068,843 B1* | 6/2015 | Sohn | G06F 3/03 |
| 2011/0125404 A1 | 4/2011 | Czompo | |
| 2013/0173207 A1 | 7/2013 | Tanenhaus | |
| 2013/0325334 A1 | 12/2013 | Mian | |
| 2013/0338961 A1* | 12/2013 | Youssef | G01C 21/005 702/141 |
| 2015/0142390 A1 | 4/2015 | Steinhart | |
| 2015/0241245 A1* | 8/2015 | Hsu | G01C 25/005 73/1.77 |
| 2016/0265937 A1* | 9/2016 | Keal | G01P 21/00 |

* cited by examiner

*Primary Examiner* — R. A. Smith
*Assistant Examiner* — John M Royston
(74) *Attorney, Agent, or Firm* — Law Office of Gerald Maliszewski; Gerald Maliszewski

(57) ABSTRACT

A system and method are provided for determining the orientation of an inertial measurement unit (IMU). The method calculates a gyroscopic quaternion, and when the IMU accelerometer reading is about equal to gravity (1 G), a field quaternion is calculated using IMU accelerometer readings. Estimates are made of angular orientation errors due to IMU angular velocity and linear acceleration, and these angular orientation errors are used to selectively mix the gyroscopic quaternion and field quaternion to supply a current sample quaternion. Alternatively, if the accelerometer reading is not about equal to 1 G, the gyroscopic quaternion is used as the current sample quaternion. In one aspect, IMU gyroscope readings and IMU accelerometer readings are calibrated in response to determining a lack of IMU movement. Near-zero gyroscope reading jitter is removed by setting the IMU gyroscopic reading to zero, when the gyroscopic reading is near zero.

13 Claims, 8 Drawing Sheets

| Fig. 2A | Fig. 2B |
|---|---|
|  | Fig. 2C |

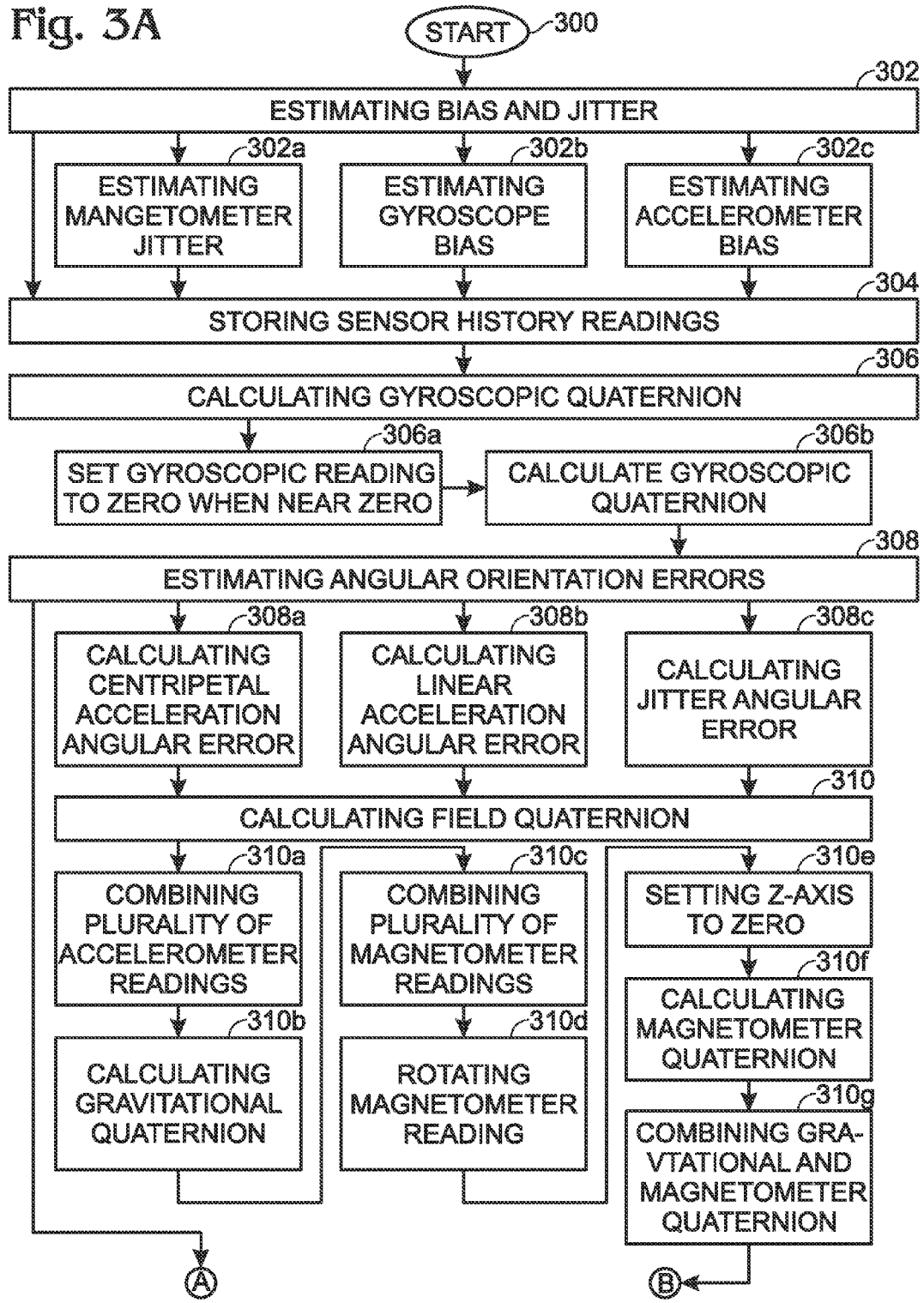

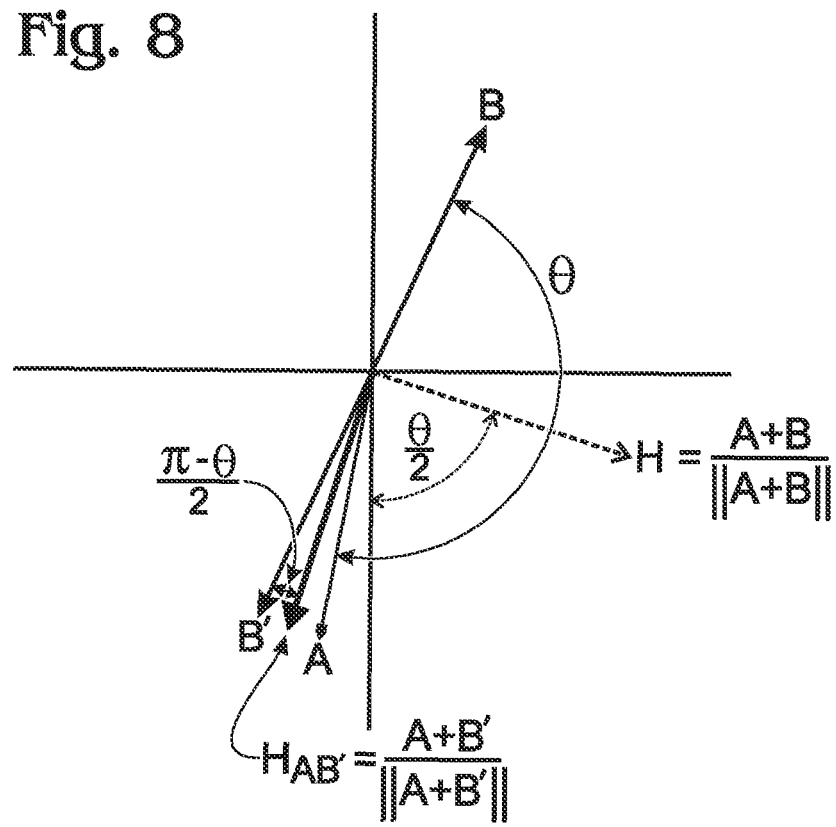

_US 9,846,040 B2_

SYSTEM AND METHOD FOR DETERMINING THE ORIENTATION OF AN INERTIAL MEASUREMENT UNIT (IMU)

BACKGROUND OF THE INVENTION

1. Field of the Invention

This invention generally relates to location and movement determination and, more particularly, to systems and methods for determining the spatial orientation of an inertial measurement unit (IMU).

2. Description of the Related Art

Inertial measurement units, also called inertial motion units, are devices that facilitate continuous computation of the orientation of the objects to which they are attached. By way of example, IMUs may be attached to human body limbs, robotic appendages, or aerial drones. IMUs typically have multiple single- or multi-axis sensors, such as gyroscopes, accelerometers, and magnetometers. Ideally, the accelerometer and magnetometer respectively measure the field strength of the local gravitational and magnetic fields produced by a reference object, such as Earth, and in turn produce sensor field strength readings. The gyroscope measures the rotational speed of the sensor relative to itself, producing a sensor rotational speed reading. The sensor field strength and rotational speed readings may be used singularly or in combination to compute the orientation of the IMU and its associated objects relative to the reference object. This object orientation is typically applied in an object motion tracking application.

Even well calibrated IMU sensors can exhibit measurement bias and measurement jitter, potentially causing noisy results in computed orientations. Further, gravitational and inertial accelerations both affect accelerometer output readings, causing an undeterminable offset in the sensor's reading from the actual direction of gravity, and therefore an uncertainty in the sensor's orientation relative to local gravitational up and down. Methods already exist for fusing IMU sensor values together to determine object orientation and mitigate sensor offsets and jitters, but they typically employ Kalman filters, which require matrix inversion and are computationally expensive. As a result, IMUs employing these methodologies typically require more expensive and current consuming processors. The larger current consumption results in the need for larger batteries or reduced operational time.

It would be advantageous if a very low processing power method existed for continuously estimating the orientation of an IMU, enabling the IMU to operate on lower performing processors, and using less electrical power to extend the battery life of the system.

It would be advantageous if this low processing power method could compensate for sensor errors such as accelerometers deviating from pointing in the direction of gravity during inertial accelerations, magnetometers that tend to have high jitter noise levels, and gyroscopes that jitter and can cause orientation estimation drift.

SUMMARY OF THE INVENTION

Disclosed herein are machine-specific algorithms modified to receive rotational velocity measurements from a 3-axis gyroscope, gravitational measurements from a 3-axis accelerometer, and (optionally) magnetic field measurements from a magnetometer, all contained in an inertial measurement unit (IMU). Two estimates of the IMU's orientation are calculated in quaternion form. The first estimate, called the gyroscopic quaternion, is based upon the previous orientation estimate of the IMU and the current gyroscope readings. The second estimate, called the field quaternion, is based upon the accelerometer and magnetometer readings. The field quaternion estimate error is calculated from the readings of all three sensor types. The gyroscopic and field quaternion estimates are combined together to form a current sample quaternion. The relative weighting of gyroscopic and field quaternions used to form the current sample quaternion is based upon the field quaternion estimate error and the angular distance between the gyroscopic and field quaternions. If the desired quaternion output rate is less than the sampled quaternion rate, then multiple consecutive sample quaternions are filtered together and decimated to produce the output quaternion. Various types of decimation filters are possible, including quaternion median and low-pass filters.

Some unique aspects of the methodology disclosed herein include the ability to estimate when the IMU is relatively still and then updating the magnetometer jitter and the accelerometer bias offset estimates. Likewise, the gyroscope bias estimate can be measured when the gyroscope readings are relatively small, to reduce gyroscope drift. The angular error can be estimated between accelerometer readings and Earth's gravitational field due to sensor inertial motion. The angular error can be estimated between magnetometer readings and Earth's magnetic field due to jitter in magnetometer readings, and the combined angular error of the accelerometer and magnetometer readings can also be estimated. Another feature is the ability to calculate a stable quaternion from two vectors, even when the two vectors approach an anti-parallel orientation. Further, a stable field quaternion can be calculated from acceleration and gyroscopic sensors, and the gyroscopic and field quaternions can be combined using a weighting based upon estimated field quaternion angular error, and the angular difference between the gyroscopic and field quaternions. The resulting quaternion output can be decimated using a quaternion median filter.

Accordingly, a method is provided for determining the orientation of an IMU. The method calculates a gyroscopic quaternion, and when the IMU accelerometer reading is about equal to gravity (1 G), the method calculates a field quaternion using IMU accelerometer readings. Estimates are made of angular orientation errors due to IMU angular velocity and linear acceleration, and these angular orientation errors are used to selectively mix the gyroscopic quaternion and field quaternion to supply a current sample quaternion. Alternatively, if the accelerometer reading is not about equal to 1 G, the gyroscopic quaternion is used as the current sample quaternion.

In one aspect, IMU gyroscope readings and IMU accelerometer readings are calibrated in response to determining a lack of IMU movement. Near-zero gyroscope reading jitter is removed by setting the IMU gyroscopic reading to zero when the gyroscopic reading is near zero. When a magnetometer is used, IMU magnetometer jitter errors are also estimated, in one aspect, in response to determining a lack of movement. Then, the field quaternion is calculated using the IMU accelerometer readings and IMU magnetometer readings. The gyroscopic quaternion and field quaternion are selectively mixed in response to the angular orientation errors and the estimated IMU magnetometer jitter errors.

Prior to calculating the field quaternion, a total angular orientation error is calculated by combining the orientation angular error due to centripetal acceleration, the orientation angular error due to linear acceleration, and (optionally) the orientation angular error due to estimated IMU magnetometer jitter.

The gyroscopic quaternion and field quaternion are selectively mixed to supply the current sample quaternion by calculating an angular difference between the gyroscopic quaternion and field quaternion, comparing the angular difference to the total angular orientation error, and adjusting the mixture in response to the comparison.

In one aspect, the field quaternion is calculated by initially calculating a gravitational quaternion able to rotate an accelerometer reading so that the normalized Z-axis component of the accelerometer reading is equal to 1. Optionally, the gravitational quaternion is used to rotate a magnetometer reading, and the rotated magnetometer reading's Z-axis component is set to zero, creating an adjusted magnetometer reading. A magnetometer quaternion is calculated that is able to further rotate the adjusted magnetometer reading so that the normalized X-axis component is equal to −1. Then, the gravitational quaternion and the magnetometer quaternion are combined.

Additional details of the above-described method and an IMU device are provided below.

BRIEF DESCRIPTION OF THE DRAWINGS

FIGS. 3A and 3B are a flowchart illustrating a summarized method for determining the orientation of an inertial measurement unit.

FIG. 8 is a diagram depicting a method for calculating a stable quaternion from two obtuse vectors.

DETAILED DESCRIPTION

Figure 1:
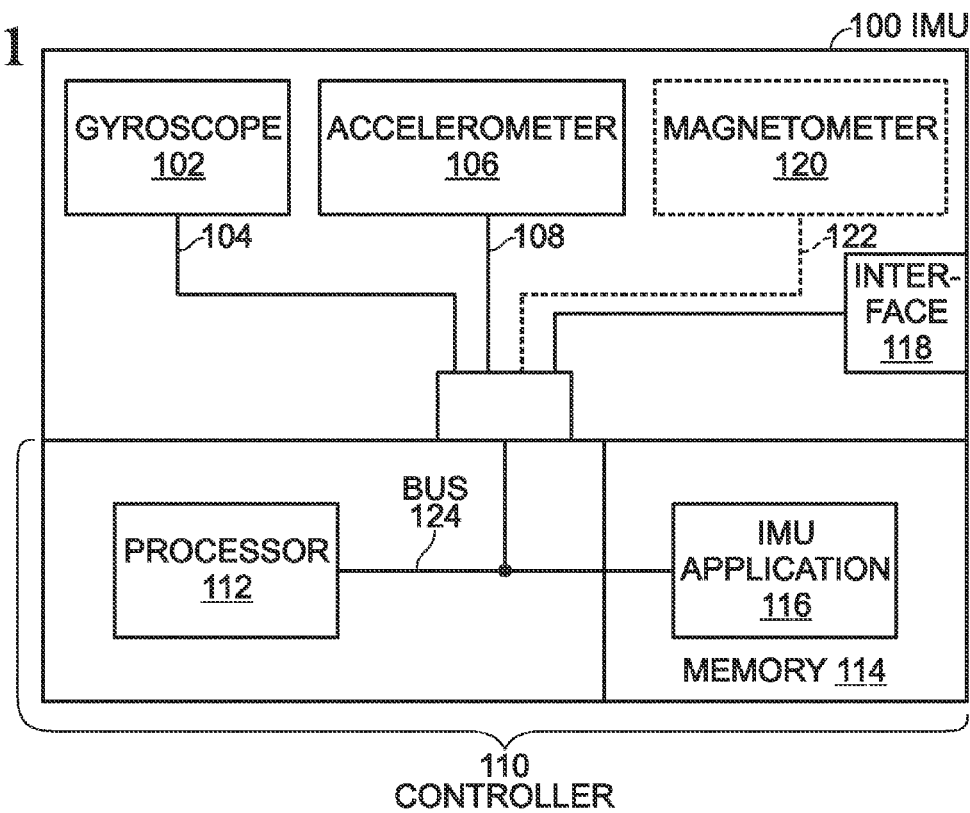
FIG. 1 is a schematic block diagram of an inertial measurement unit (IMU).

FIG. 1 is a schematic block diagram of an inertial measurement unit (IMU). The IMU 100 comprises a gyroscope 102 having an output on line 104 to supply gyroscopic readings. An accelerometer 106 has an output on line 108 to supply accelerometer readings. The IMU 100 further comprises a controller 110, with a processor 112, a non-transitory memory 114, and an IMU application 116 residing in the non-transitory memory. The IMU application 116 comprises a sequence of processor executable instructions for calculating a gyroscopic quaternion in response to gyroscopic readings, and calculating a field quaternion using accelerometer readings when an accelerometer reading is about equal to gravity (1 G). The IMU application 116 estimates angular orientation errors due to IMU angular velocity and linear acceleration, and uses the angular orientation errors to selectively mix the gyroscopic quaternion and field quaternion to supply a current sample quaternion via interface 118. Alternatively, the IMU application 116 uses the gyroscopic quaternion as the current sample quaternion when the accelerometer reading is not about equal to 1 G. The term "about equal to gravity" in this context typically means a reading magnitude that is within 1% of 1 G.

Optionally, the IMU 100 further comprises a magnetometer 120 (shown in phantom) having an output on line 122 to supply magnetometer readings. In this case, the IMU application 116 estimates magnetometer jitter errors in response to magnetometer readings, and calculates the field quaternion using the accelerometer readings and magnetometer readings. Then, the IMU application 116 selectively mixes the gyroscopic quaternion and field quaternion includes in response to the angular orientation errors and the estimated magnetometer jitter errors.

The controller 110 typically employs a bus 124 or other communication mechanism for communicating information between the sensors 102 and 106 (and optionally 120), processor 112, memory 114, and interface 118. The communication bus 124 may, for example, be a Serial Peripheral Interface (SPI), an Inter-Integrated Circuit (I$^2$C), a Universal Asynchronous Receiver/Transmitter (UART), and/or any other suitable bus or network. Although the drawing implies that the components of the controller 110 are collocated in the same device, in some aspects various components may be located outside the IMU device, communicating with other components of the IMU via a hardwire or wireless connection.

The memory 114 may include a main memory, a random access memory (RAM), or other dynamic storage devices. These memories may also be referred to as a computer-readable medium. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read. The execution of the sequences of instructions contained in a computer-readable medium (i.e. IMU application 116) may cause the processor 112 to perform some of the steps of estimating readings and calculating quaternions. Alternately, some of these functions may be performed in hardware (not shown). The practical implementation of such a computer system would be well known to one with skill in the art. In one aspect, the processor 112 is an ARM processor using a reduced instruction set computing (RISC) architecture.

The interface 118 may be more than one interface. The interface may be a display, a modem, an Ethernet card, or any other appropriate data communications device such as USB. The physical communication links may be optical, wired, or wireless. The interface 118 may incorporate appropriate input/output (IO) ports for user interface interconnection, such as a keypad or a cursor control device such as a mouse, touchpad, touchscreen, trackball, stylus, or cursor direction keys.

Application Ser. No. 14/707,194, filed May 8, 2015, entitled METHOD AND SYSTEM FOR WIRELESS TRANSMISSION OF QUATERNIONS, invented by Bryan Hallberg, which is incorporated herein by reference, describes a method of efficiently transmitting quaternions over a wireless network from multiple sensors.

The IMU 100 may be considered a type of special purpose computing system, and as such, can be programmed, configured, and/or otherwise designed to comply with one or more networking protocols. According to certain embodiments, the IMU 100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, interface 118 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Examples of interface 118 include, without limitation, a link adapter, a wired network interface (such as a network interface card), a wireless network interface (such as a wireless network interface card), and any other suitable interface. In at least one embodiment, interface 118 may provide a direct connection to a remote server via a direct link to a network, such as the Internet. Interface 118 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, the interface 118 may also represent a host adapter configured to facilitate communication between IMU 100 and one or more network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like.

A conventional gyroscope measures angular rotation speed, and has non-zero bias offset that jitters and varies with sensor temperature. Over time, the bias offset creates integration errors. A conventional accelerometer measures the direction of sensor acceleration, but it cannot distinguish between gravity and inertial acceleration (i.e., an axiom of General Relativity). A conventional magnetometer measures the direction of a local magnetic field, and it cannot distinguish between Earth's field and any other nearby fields. Unfortunately, magnetometer readings also typically include significant noise.

Ideally, an IMU's orientation could be calculated by knowing its previous location and integrating the angular velocity reported by a 3-axis gyroscope. However, gyroscope bias, and especially jittering bias, cause integration errors over time and subsequently cause the orientation estimate to drift away from the IMU's actual orientation.

Alternatively, an IMU's orientation could be calculated from its accelerometer and magnetometer readings. However, accelerometers cannot distinguish between gravity and inertial acceleration. So, gravity's direction cannot be accurately determined when the IMU is either rotating or linearly accelerating. Also, magnetometers produce readings that jitter substantially. So, the calculated IMU's orientation may also jitter when based upon a jittering magnetometer reading. To compensate for the above issues, a sensor fusion algorithm can be used that estimates and mitigates for these errors. Such sensor fusion algorithms are most often based on Kalman filters that require extensive processing power.

The IMU application 116 uses an orientation algorithm to convert the readings from the three types of 3-axis sensors (accelerometer, magnetometer (optionally), gyroscope) into a single spatial orientation vector represented as a quaternion. Quaternions are selected because they are mathematically efficient and stable relative to other options, such as Euler angles. A common property of Euler Angles, Tait-Bryan Angles, and quaternions is that they describe the orientation of one spatial coordinate system relative to another spatial coordinate system. Quaternions uses a 4-element rotation vector (r, x, y, z), which requires no trigonometric functions to calculate results. Concatenating rotations are computationally fast and numerically stable. Euler angles and Tait-Bryan angles, on the other hand, uses a 3-element rotation vector ($\alpha$, $\beta$, $\gamma$), which requires trigonometric functions to calculate results. In addition, these methods suffer from gimbal lock, an inability to distinguish between two rotational axes, such as when one axis is rotated parallel to a second axis, and they can be numerically unstable.

Figure 5:
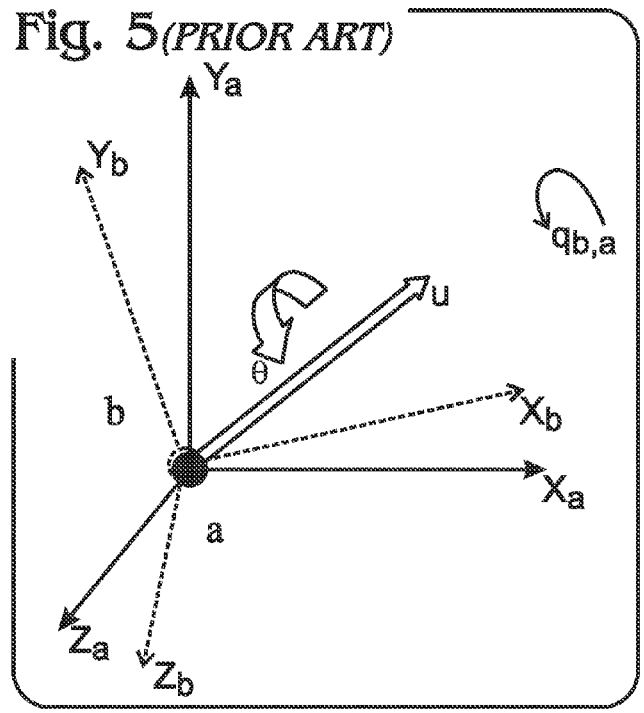
FIG. 5 is a diagram depicting a quaternion coordinate system (prior art).

FIG. 5 is a diagram depicting a quaternion coordinate system (prior art). The quaternion 4-element vector (r, x, y, z) is based on a rotation angle $\theta$ and unit length rotation axis $\vec{u}$. A quaternion that rotates an object from spatial coordinate system A to spatial coordinate system B is defined as the normalized vector $_A^B Q$.

$$_A^B Q = (r, x, y, z) = r + \hat{i}x + \hat{j}y + \hat{k}z$$

$$\hat{i}^2 = \hat{j}^2 = \hat{k}^2 = \hat{i}\hat{j}\hat{k} = -1$$

$$r = \cos\left(\frac{\theta}{2}\right); x = u_x \sin\left(\frac{\theta}{2}\right); y = u_y \sin\left(\frac{\theta}{2}\right); z = u_z \sin\left(\frac{\theta}{2}\right)$$

$$r^2 + x^2 + y^2 + z^2 = 1$$

Null Rotation $\theta = 0$ $Q = (1,0,0,0)$

Inverse of a Given Quaternion $$_A^B Q' = _B^A Q$$

$\theta \rightarrow -\theta; (r,x,y,z) \rightarrow (r,-x,-y,-z)$

Multiplication $$Q_1 Q_2 = (r_1 + \hat{i}x_1 + \hat{j}y_1 + \hat{k}z_1)(r_2 + \hat{i}x_2 + \hat{j}y_2 + \hat{k}z_2)$$

$$Q_1 Q_2 = (r_1 r_2 - x_1 x_2 - y_1 y_2 - z_1 z_2) + \hat{i}(r_1 x_2 + x_1 r_2 + y_1 z_2 - z_1 y_2) + \hat{j}(r_1 y_2 - x_1 z_2 + y_1 r_2 + z_1 x_2) + \hat{k}(r_1 z_2 + x_1 y_2 - y_1 x_2 + z_1 r_2)$$

Transpose Multiplication (Quaternion Transpose Includes Conjugation)

$$R(Q_1 Q'_2) = Q_1^T Q_2 = r_1 r_2 + x_1 x_2 + y_1 y_2 + z_1 z_2$$

Concatenated Rotations

Concatenated rotations are calculated by multiplying quaternions in order of rotations $$_A^C Q = {_B^C Q} {_A^B Q}$$

Rotating a Vector from Frame a to Frame B $$V_B = {_A^B Q} V_A {_A^B Q'} = {_A^B Q} V_{AB} {_A^A Q}$$

The application-specific algorithm disclosed herein calculates the orientation of an IMU in quaternion form and mitigates errors due to sensor bias offsets, sensor jitter, and the indistinguishability of gravity and inertial accelerations. This application-specific algorithm runs on low computational power processors to reduce overall system cost and battery power consumption. Each sensor typically has a non-zero bias that may be removed from the raw reading to obtain an estimated bias-free reading. Application Ser. No. 14/742,852, filed Jun. 18, 2015, entitled SENSOR CALIBRATION METHOD AND SYSTEM, invented by Bryan Hallberg, which is incorporated herein by reference, describes a method of estimating and removing the estimated bias of the accelerometer and magnetometer readings. A method for removing estimated gyroscope bias from the gyroscope's raw reading is described herein.

The IMU application 116 estimates the IMU magnetometer jitter errors (if present), and calibrates the gyroscope readings and accelerometer readings in response to determining a lack of IMU movement.

Figure 2:
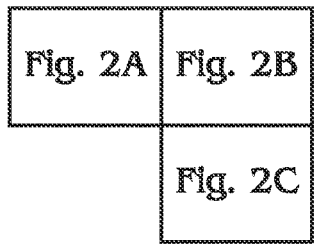
FIG. 2 is an overall flowchart map for an orientation calculation algorithm depicted in FIGS. 2A through 2C, specifically tailored for use in the IMU of FIG. 1.
Figure 2A:
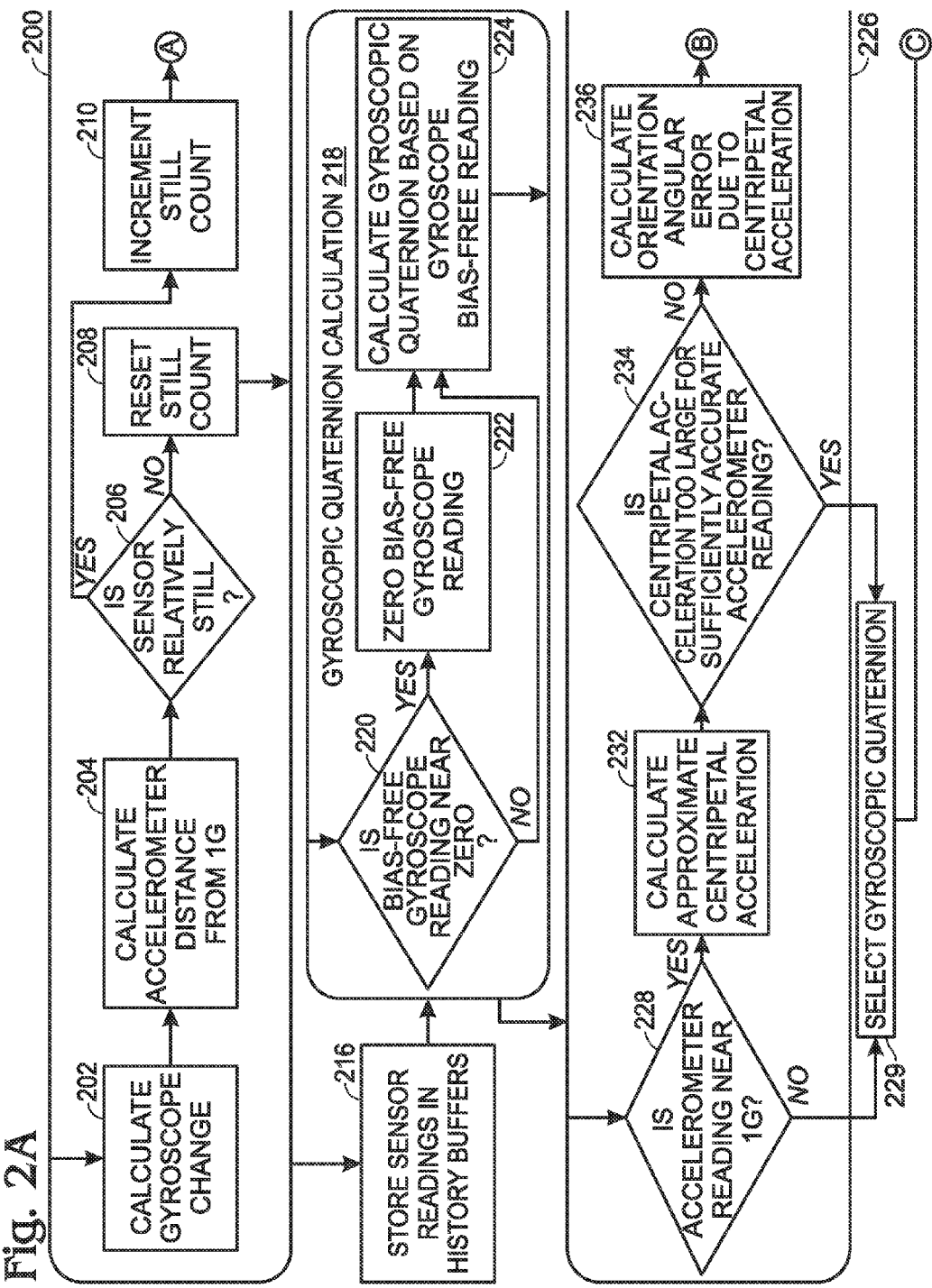
Figure 2B:
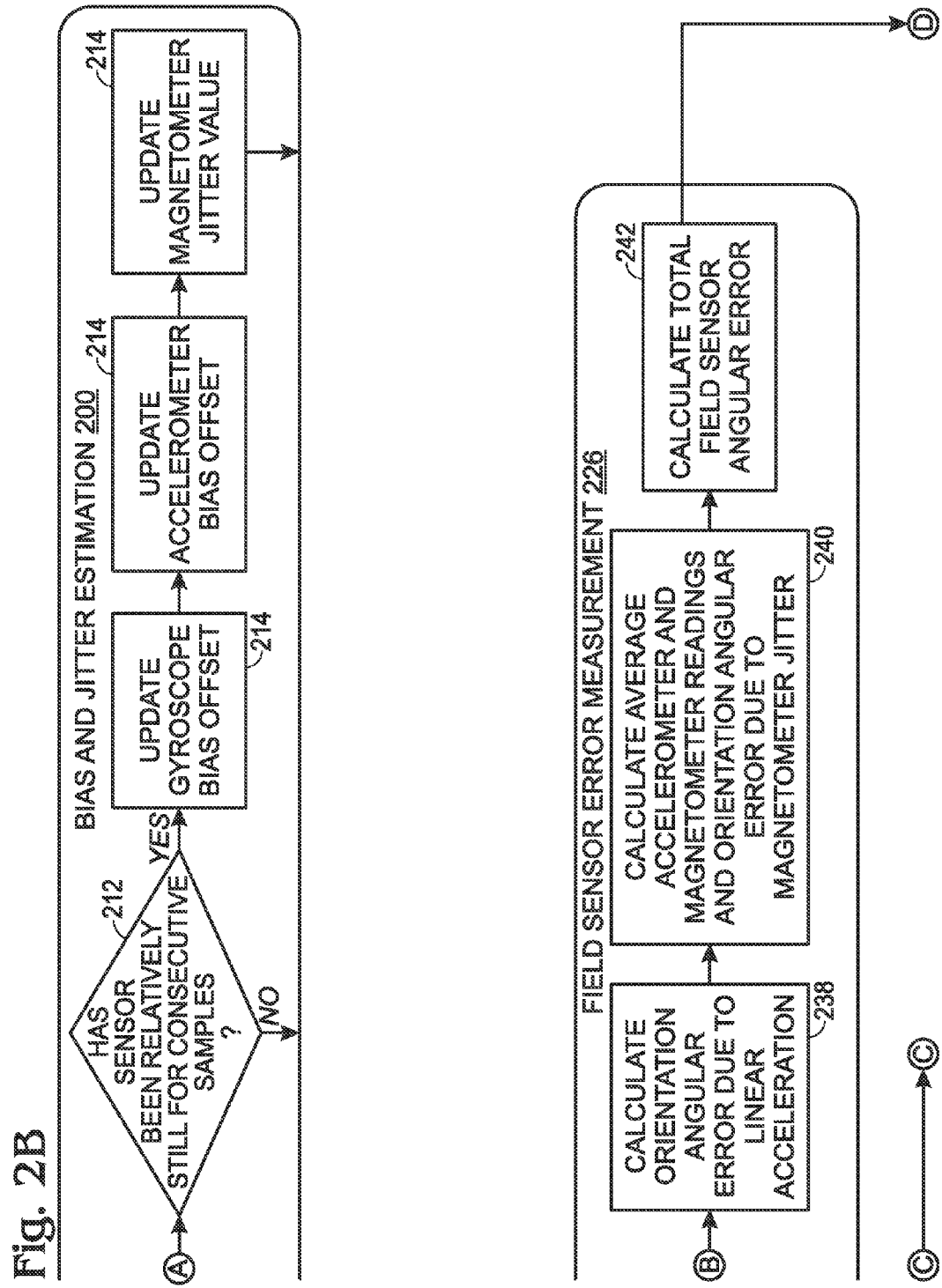
Figure 2C:
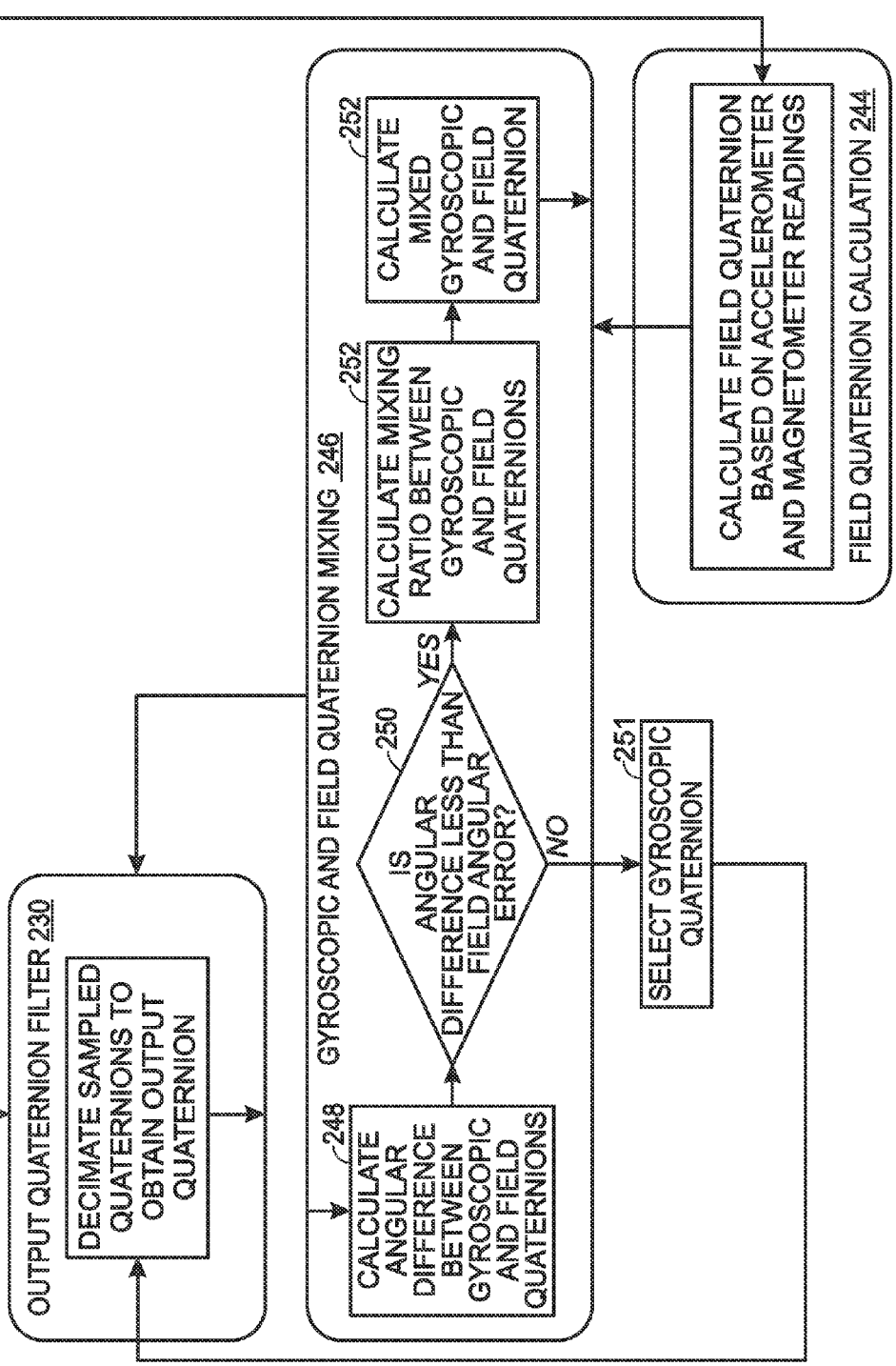

FIG. 2 is an overall flowchart map for an orientation calculation algorithm depicted in FIGS. 2A through 2C, specifically tailored for use in the IMU of FIG. 1. In FIG. 2A, the "Bias & Jitter Estimation" block (200) first calculates estimates of the relative stillness of the IMU. Initially, the current and previous raw gyroscope readings are compared to each other (202) and the magnitude of the estimated bias-free accelerometer reading is compared to gravity (204). If the square of the magnitude of the gyroscope difference is less than a predetermined amount (typically the square of 1 degree per second) and the square of the magnitude of the accelerometer is different from the square of gravity by less than a predetermined amount (typically the square of 1% of gravity), then the IMU is considered to be instantaneously relatively still (206).

If the IMU is not instantaneously relatively still, then the still counter is reset to zero (208). Otherwise, it is incremented (210). In FIG. 2B, if the IMU has been relatively still for at least a predetermined consecutive number of measurements (e.g., 4) (212), then the IMU is considered sufficiently still to update bias and jitter estimates (214).

$$\text{If } \prod_0^3 (((\|\omega_n - \omega_{n-1}\|^2 < \omega_{Threshold}^2) \,\&\&\, (\|\|a_n\|^2 - g^2\| < a_{Threshold}^2))$$

Then IMU is Relatively Still

The gyroscope bias is updated by inputting the previous gyroscope reading into a 3-dimensional low-pass filter. The filter independently filters each of the three axes. The previous reading is used because it may be more still than the current reading, since it is known to lie between two relatively still readings. The output of the filter is the updated estimated gyroscope bias.

Accelerometer bias estimates can also be updated, by calling its particular bias update routine. An example bias update routine is disclosed in parent application Ser. No. 14/742,852. The magnetometer jitter estimate is also updated when the IMU is relatively still. The magnitude of the instantaneous jitter is measured by calculating the magnitude of the difference between the current and the immediately previous estimated bias-free magnetometer readings. This instantaneous magnitude is input into a one-dimensional low-pass filter. The output of the filter is the updated estimated magnetometer jitter.

$$J_m = f_{lpf}(\|m_n - m_{n-1}\|)$$

Returning to FIG. 2A, after exiting the "Bias & Jitter Estimation" block (200), the current accelerometer and magnetometer estimated bias-free readings are each stored in a history buffer (e.g., memory 114 of FIG. 1) used later for sensor jitter mitigation. The length of these buffers is equal to the maximum length of the jitter mitigation filter, e.g., 15 samples. The current raw gyroscope reading is stored in a history buffer that only needs to be one sample long (216). That value is used in the relative stillness estimation described above.

After storing the current values into the history buffers, processing continues with the "Gyroscopic Quaternion Calculation" block (218). This block calculates an updated estimate for the IMU orientation based upon the previous IMU orientation estimate and the current estimated bias-free gyroscope reading. First, the estimated bias-free reading is compared to zero (220). If the value is near zero (e.g., within two for a gyroscope that produces values between +/−32767 for rotational speeds between +/−2000 degrees per second), then the reading is set to zero (222). This removes errors caused by small gyroscope readings that contain only jitter information when the IMU is still.

Next, the updated estimated gyroscopic quaternion is calculated using the estimated bias-free gyroscope reading (224). The actual calculation is performed as follows (prior art).

$${_E^S Q_i} = \text{previous quaternion}$$

$$G_\omega = (0, \omega_x, \omega_y, \omega_z) = \text{gyroscope reading}$$

$${_E^S \dot{Q}_\omega} = \frac{1}{2} {_E^S Q_i} G_\omega = \text{quaternion rate of change}$$

$$\Delta Q_\omega = {_E^S \dot{Q}_\omega} \Delta t$$

$${_E^S Q_{\omega, i+1}} =$$

$${_E^S Q_i} + \Delta Q_\omega = {_E^S Q_i} + \frac{1}{2} {_E^S Q_i} G_\omega \Delta t = \text{new quaternion after time } \Delta t.$$

After exiting the "Gyroscopic Quaternion Calculation" block (218), processing continues with the "Field Sensor Error Measurement" block (226). This block estimates the amount of angular error that a quaternion would have if it were calculated from only accelerometer and magnetometer estimated bias-free readings.

If the accelerometer estimated bias-free reading is not near 1 G (228), then the reading has definitely been significantly affected by inertial motion of the IMU and, ideally, should not be used to calculate the IMUs orientation.

$a_m = a_i + g$ = accelerometer measurement, sum of inertial acceleration and gravity. The greatest angular error occurs when the inertial acceleration is perpendicular to either gravity or the measured acceleration. The estimated error separates into two cases:

$$\left| \frac{\|\|a_m\| - \|g\|\|}{\|g\|} \right| > a_{Threshold} \text{ case:}$$

The accelerometer measurement is outside acceptable limits and the accelerometer measurement is considered not valid. If the magnitude of the accelerometer estimated bias-free reading differs from 1 G by more than a predetermined value (e.g., 0.25 G), then the gyroscopic quaternion is selected as the current sample quaternion (229) and processing continues with the "Output Quaternion Filter" block (230).

$$\left| \frac{\|\|a_m\| - \|g\|\|}{\|g\|} \right| \leq a_{Threshold} \text{ case:}$$

The accelerometer measurement is within acceptable limits and is $a_i$ assumed sufficiently near 0 to not adversely influence the estimate of the IMU's orientation relative to gravity. The measurement might still be not valid if $\|a_i + g\| \approx \|g\|$.

Figure 6:
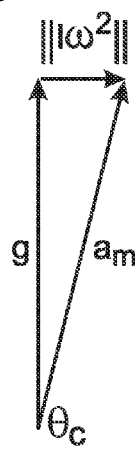
FIG. 6 is a diagram depicting the most error producing direction of centripetal acceleration relative to gravitational acceleration.

Processing continues with estimating the centripetal acceleration acting upon the IMU (232), as IMU rotation affects accelerometer measurements. Referring briefly to FIG. 6, for an IMU placed a distance l from the rotational center, the centripetal acceleration is given by $a_r = l\|\omega\|^2 =$ centripetal acceleration measured by sensor accelerometer;

$\omega$=angular velocity;
l=distance from rotation center.

In the measurement error calculation, the greatest angular error occurs when centripetal acceleration is perpendicular to gravity's direction and is given by:

$$\theta_c = \arctan\left(\frac{a_r}{\|g\|}\right) = \arctan\left(l\frac{\|\omega\|^2}{\|g\|}\right)$$

The angular velocity required to reach a particular angular error threshold can be calculated from:

$$\|\omega\| = \sqrt{\frac{\|g\|}{l}\tan(\theta_{Threshold})}$$

$$\|\omega\|^2 = \frac{\|g\|}{l}\tan(\theta_{Threshold})$$

If the centripetal acceleration calculated from the estimated bias-free gyroscope reading is significant relative to gravity (234), then the accelerometer reading has been significantly affected by rotational motion of the IMU and, ideally, should not be used to calculate the IMU's orientation. The square of magnitude of the estimated bias-free gyroscope reading is compared to a maximum allowed value dependent upon an allowed maximum angle error (e.g., 30 degrees) and an assumed IMU member length l (e.g., if mounted on a human limb–1 meter). If the reading's magnitude is larger than this threshold value, then the gyroscopic quaternion is selected as the current sample quaternion (229) and processing continues with the "Output Quaternion Filter" block (230). Otherwise, processing continues with estimating the angular error caused by centripetal acceleration acting upon the IMU (236).

The centripetal angular error estimate is performed with the following equations using the previously assumed maximum member length. Since the centripetal angular error is small, the arctangent function can be estimated simply using the computed value to reduce processing power requirements. This is possible because the first term of the Taylor expansion for arctan(x) is simply x.

$$\theta_c = \arctan\left(\frac{a_r}{\|g\|}\right) = \arctan\left(l\frac{\|\omega\|^2}{\|g\|}\right) \cong l\frac{\|\omega\|^2}{\|g\|} \text{ for small } \theta_c$$

Figure 7:
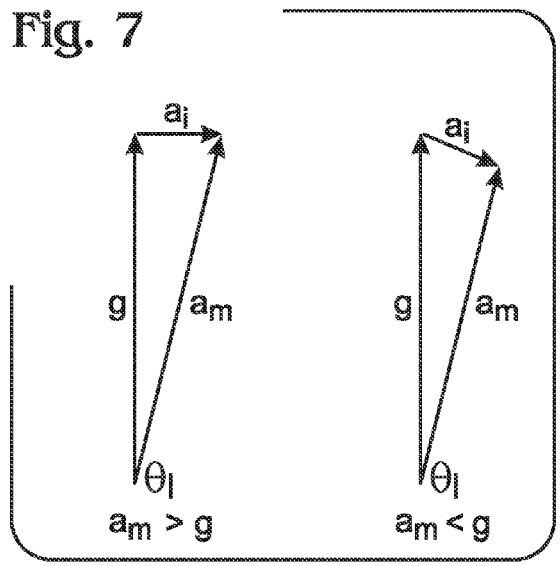
FIG. 7 is a diagram depicting the most error producing direction of inertial acceleration relative to gravitational acceleration.

Referring to FIGS. 7 and 2B, the angular error caused by the IMU's linear acceleration (238) is estimated by assuming that any difference between the magnitude of the estimated bias-free accelerometer reading and gravity is caused by an acceleration perpendicular to gravity or to the measured acceleration, as acceleration in these directions would cause the greatest angular error. If the estimated bias-free acceleration is larger than gravity, then the angular error is estimated by the following equation. Since the angular error is small, the sine function can be estimated using simply the computed value to reduce processing power requirements. This is possible because the first term of the Taylor expansion for sin(x) is simply x.

$$\theta_l = \arcsin\left(\frac{\sqrt{\|a\|^2 - g^2}}{\|a\|}\right) \cong \frac{\sqrt{\|a\|^2 - g^2}}{\|a\|} \text{ for small } \theta_l$$

If the estimated bias-free acceleration is less than gravity, then the angular error is estimated by $$\theta_l = \arcsin\left(\frac{\sqrt{g^2 - \|a\|^2}}{g^2}\right) \cong \frac{\sqrt{g^2 - \|a\|^2}}{g^2} \text{ for small } \theta_l$$

Magnetometers typically jitter much more than accelerometers, so field quaternion jitter mitigation is governed by magnetometer jitter measurements. The set of estimated bias-free magnetometer readings just previous to the current reading, and within a predetermined distance from the current reading, is located starting at the reading just previous in time to the current reading and moving backward in time from there. The set has a predetermined number of maximum readings (e.g., 16). The magnitude of the squared distance between the current reading and a previous reading is calculated using the squared magnitude of the difference between the current estimated bias-free magnetometer reading and the previous reading. The set ends when the squared magnitude distance (i.e., angle) to a previous reading is greater than or equal a multiple (e.g., 4) of the squared magnitude of the estimated magnetometer jitter calculated by the "Bias & Jitter Estimation" block (200). The average magnetometer reading is calculated by averaging together the current estimated bias-free magnetometer reading and all magnetometer readings in the set. The average accelerometer reading is calculated using the current estimated bias-free accelerometer reading and the set of accelerometer readings temporally co-located with the set of located magnetometer readings (240). The magnitude of the current magnetometer reading's jitter is estimated by dividing the estimated magnetometer jitter by the number of readings used to calculate the average magnetometer reading. The jitter angular error is estimated by dividing the magnitude of the current reading's jitter by the magnitude of the average magnetometer reading.

Measure the jitter between current magnetometer reading and previous readings:

$$N = \min(N_{max}, (\|m_0 - m_{0-n}\|^2 < \alpha_j \overline{j_m^2})) = \text{total previous readings};$$

$N_{max} = 16$;
$\alpha_j = 4 =$ jitter distance threshold multiplier.

Measure the magnetometer and accelerometer average reading over previous low jitter readings and estimate jitter:

$$\overline{m} = \frac{1}{N+1} \sum_0^N (m_{0-n}) = \text{average magnetometer reading};$$

$$\overline{a} = \frac{1}{N+1} \sum_0^N (a_{0-n}) = \text{average accelerometer reading};$$

$$\overline{JmN} = \frac{\overline{Jm}}{N+1} = \text{estimated jitter in average magnetometer reading}.$$

Convert jitter distance to jitter angle:

$$\overline{\theta_{jm}} = \arcsin\left(\frac{\overline{JmN}}{\|\overline{m}\|}\right) \cong \frac{\overline{JmN}}{\|\overline{m}\|} \text{ for small } \overline{\theta_{jm}}.$$

The total field sensor angular error is estimated by summing the maximum of the centripetal acceleration and linear acceleration angular errors with a multiple (e.g., 4) of the jitter angular error (242). The multiple is used to include a few standard deviations of jitter in the angular error measurement.

$$\theta_{fe} = \max(\theta_c, \theta_l) + \alpha_{jitter} \overline{\theta_{jm}}$$

Returning to FIG. 1, the IMU application 116, prior to calculating the field quaternion, calculates a total angular orientation error by combining an orientation angular error due to centripetal acceleration, an orientation angular error due to linear acceleration, and (optionally) an orientation angular error due to estimated magnetometer jitter. Next, the IMU application 116 calculates an angular difference between the gyroscopic quaternion and the field quaternion, compares this angular difference to the total angular orientation error, and selectively mixes the gyroscopic quaternion and field quaternion in response to the comparison.

The IMU application 116 calculates the field quaternion by calculating a gravitational quaternion able to rotate an accelerometer reading so that a normalized Z-axis component of the accelerometer reading is equal to 1. The IMU application uses the gravitational quaternion to rotate a magnetometer reading, and sets the rotated magnetometer reading's Z-axis component to zero, creating an adjusted magnetometer reading. The IMU application calculates a magnetometer quaternion able to further rotate the adjusted magnetometer reading so that a normalized X-axis component is equal to −1, and then combines the gravitational quaternion and the magnetometer quaternion.

In FIG. 2C, after completing the field angular error estimate (242 of FIG. 2B), processing exits the "Field Sensor Error Measurement" block (226) and proceeds to the "Field Quaternion Calculation" block (244) to calculate the field quaternion. The field quaternion is calculated from the average accelerometer and magnetometer readings. Calculating a quaternion from two vectors is known, and is described as follows.

A quaternion that rotates vector A to vector B is calculated using the following method:

$$H = \frac{A+B}{\|A+B\|} = \text{half vector (vector halfway between } A \text{ and } B\text{)};$$

$$R = \frac{H \times B}{\|H \times B\|} = \text{normalized cross product of } H \text{ and } B \text{ (gives rotation axis)};$$

$r = H \cdot B = $ dot product of $H$ and $B$ (gives $r$ value of $Q$);

$\hat{i}x + \hat{j}y + \hat{k}z = R\sqrt{1-r^2}$ (gives $x,y,z$ value of $Q$);

$Q = r + \hat{i}x + \hat{j}y + \hat{k}z;$ $${}_A^B Q = (H \cdot B) + [R\sqrt{1-(H \cdot B)^2}].$$

However, prior art methods suffer from stability and erroneous results when the two vectors are relatively antiparallel, and are particularly unstable when using integer math as opposed to floating point. Integer math is preferred over floating point to reduce computational processing power requirements. A stable method for calculating a quaternion is presented below.

Half vector is equal to or nearly equal to a null vector:

$$A + A' = 0; \|A + A'\| = 0; \frac{A+A'}{\|A+A'\|} = \text{undefined}.$$

When two vectors spatially differ by more than 90°, then calculating the half vector between one of the vectors and the other vector's inverse produces a more accurate result:

If $A \cdot B < 0$, then Use B' to Calculate Quaternion.

Referring to FIG. 8, a quaternion that rotates vector A to vector B is calculated using the following method:

$$H_{AB'} = \frac{A + B'}{\|A + B'\|} = \text{half vector (vector halfway between } A \text{ and } B'\text{)}.$$

Quaternion element r is calculated using the following method:

$$H_{AB'} \cdot B' = \cos\left(\frac{(\pi - \theta)}{2}\right)$$

$\cos(a+b) = \cos(a)\cos(b) - \sin(a)\sin(b)$ (cosine addition law);

$$\cos\left(\frac{(\pi-\theta)}{2}\right) = \cos\left(\frac{\pi}{2}\right)\cos\left(-\frac{\theta}{2}\right) - \sin\left(\frac{\pi}{2}\right)\sin\left(-\frac{\theta}{2}\right) = \sin\left(\frac{\theta}{2}\right)$$

$\sin^2(\theta) + \cos^2(\theta) = 1$ (Pythagorean Trigonometric Identity);

$$\cos\left(\frac{\theta}{2}\right) = \sqrt{1 - \sin^2\left(\frac{\theta}{2}\right)} = \sqrt{1 - \cos^2\left(\frac{(\pi-\theta)}{2}\right)} = \sqrt{1 - (H_{AB'} \cdot B')^2};$$

$$r = \cos\left(\frac{\theta}{2}\right) = \sqrt{1 - (H_{AB'} \cdot B')^2}.$$

Quaternion elements (x, y, z) are calculated using the following method:

$$R = \frac{H_{AB'} \times B}{\|H_{AB'} \times B\|} =$$

normalized cross product of $H_{AB'}$ and $B$ (gives rotation axis);

$$\sin\left(\frac{\theta}{2}\right) = H_{AB'} \cdot B' \text{ (From above)};$$

$$\hat{i}x + \hat{j}y + \hat{k}z = R\sin\left(\frac{\theta}{2}\right) = R(H_{AB'} \cdot B');$$

$${}_A^B Q = \sqrt{1 - (H_{AB'} \cdot B')^2} + [R(H_{AB'} \cdot B')].$$

A field quaternion is calculated by using the average accelerometer reading to first calculate a gravitational quaternion, which rotates the IMU accelerometer reading to align with gravity as described below.

Calculate a quaternion to rotate measured acceleration vector to Earth's gravitational vector:

$g = (0, 0, 1) =$ Earth Z-axis vector aligns with gravity;

$a = \frac{a_m}{\|a_m\|} =$ normalized acceleration vector ($a_m$ = measure acceleration vector).

If $a_z=1$, then $\angle ag$ is 0 degrees:
${}_a^g Q = (1,0,0,0)$.

If $a_z=-1$, then $\angle ag$ is 180 degrees:
Set the quaternion to the normalized value of the previous gravitational quaternion with its r component set to zero;

$${}_a^g Q_n = \frac{{}_a^g Q_{n-1}(0, 1, 1, 1)}{\|{}_a^g Q_{n-1}(0, 1, 1, 1)\|} = \frac{(0, x_{n-1}, y_{n-1}, z_{n-1})}{\|(0, x_{n-1}, y_{n-1}, z_{n-1})\|}.$$

If $0 \le a_z < 1$, then $\angle ag$ is 90 degrees or acute:

$$H_{ag} = \frac{a+g}{\|a+g\|} = \frac{\hat{i}a_x + \hat{j}a_y + \hat{k}(a_z+1)}{\|\hat{i}a_x + \hat{j}a_y + \hat{k}(a_z+1)\|} = \frac{\hat{i}a_x + \hat{j}a_y + \hat{k}(a_z+1)}{\sqrt{a_x^2 + a_y^2 + (a_z+1)^2}}$$

$$R = \frac{H_{ag} \times g}{\|H_{ag} \times g\|} = \frac{\hat{i}a_y - \hat{j}a_x}{\sqrt{a_y^2 + a_x^2}};$$

$$H_{ag} \cdot g = \frac{a_z + 1}{\sqrt{a_x^2 + a_y^2 + (a_z+1)^2}}$$

$${}_a^g Q = (H_{ag} \cdot g) + \left[R\sqrt{1-(H_{ag} \cdot g)^2}\right] = \frac{(a_z+1) + \hat{i}(a_y) + \hat{j}(-a_x)}{\sqrt{a_x^2 + a_y^2 + (a_z+1)^2}}$$

If $-1 < a_z < 0$, then $\angle ag$ is obtuse:

$$H_{ag'} = \frac{a+g'}{\|a+g'\|} = \frac{\hat{i}a_x + \hat{j}a_y + \hat{k}(a_z-1)}{\|\hat{i}a_x + \hat{j}a_y + \hat{k}(a_z-1)\|} = \frac{\hat{i}a_x + \hat{j}a_y + \hat{k}(a_z-1)}{\sqrt{a_x^2 + a_y^2 + (a_z-1)^2}}$$

$$r = \sqrt{1 - (H_{ag'} \cdot g')^2} =$$

$$\sqrt{1 - \frac{(-(a_z-1))^2}{a_x^2 + a_y^2 + (a_z-1)^2}} = \sqrt{1 - \frac{(a_z-1)^2}{a_x^2 + a_y^2 + (a_z-1)^2}}$$

$$R = \frac{H_{ag'} \times g}{\|H_{ag'} \times g\|} = \frac{\hat{i}a_y - \hat{j}a_x}{\sqrt{a_y^2 + a_x^2}}$$

$$\hat{i}x + \hat{j}y + \hat{k}z =$$

$$R\sin\left(\frac{\theta}{2}\right) = R(H_{ag'} \cdot g') = \frac{\hat{i}a_y - \hat{j}a_x}{\sqrt{a_y^2 + a_x^2}} \sqrt{\frac{(a_z-1)^2}{a_x^2 + a_y^2 + (a_z-1)^2}}$$

$${}_a^g Q = \sqrt{1 - (H_{ag}' \cdot g')^2} + [R(H_{ag} \cdot g)] =$$

$$\sqrt{1 - \frac{(a_z-1)^2}{a_x^2 + a_y^2 + (a_z-1)^2}} + \frac{\hat{i}a_y - \hat{j}a_x}{\sqrt{a_y^2 + a_x^2}} \sqrt{\frac{(a_z-1)^2}{a_x^2 + a_y^2 + (a_z-1)^2}}$$

The gravitational quaternion is then used to rotate the average magnetometer reading so that it aligns with gravity. The rotated average magnetometer reading is then projected onto the XY-plane that parallels Earth's surface and that projected reading is used to calculate a magnetic quaternion aligned purely with the Z-axis, as described below.

Rotate the measured magnetometer reading using gravitational quaternion:

$m_g = {}_a^g Q m_{mg} {}_a^g Q.$

Calculate the normalized magnetic field vector perpendicular to the (e.g., Earth's) gravitational field:

$$m = \hat{i}m_x + \hat{j}m_y = \frac{\hat{i}m_{gx} + \hat{j}m_{gy}}{\sqrt{m_{gx}^2 + m_{gy}^2}}.$$

Calculate Z-axis quaternion to rotate magnetic field vector to the magnetic pole (e.g., North):
$n=(-1, 0, 0)=$Earth negative X-axis vector aligns with North;
If $m_x=-1$, then $\angle mn$ is 0 degrees:

${}_m^n Q=(1,0,0,0)$.

If $m_x=1$, then $\angle mn$ is 180 degrees:
Set the quaternion to the normalized value of the previous magnetic quaternion with its r component set to zero;

$${}_m^n Q_n = \frac{{}_m^n Q_{n-1}(0, 1, 1, 1)}{\|{}_m^n Q_{n-1}(0, 1, 1, 1)\|} = \frac{(0, x_{n-1}, y_{n-1}, z_{n-1})}{\|(0, x_{n-1}, y_{n-1}, z_{n-1})\|}.$$

If $-1 < m_x \le 0$, then $\angle mn$ is 90 degrees or acute:

$$H_{mn} = \frac{m+n}{\|m+n\|} = \frac{\hat{i}(m_x-1) + \hat{j}m_y}{\|\hat{i}(m_x-1) + \hat{j}m_y\|} = \frac{\hat{i}(m_x-1) + \hat{j}m_y}{\sqrt{(m_x-1)^2 + m_y^2}}$$

$$R = \frac{H_{mn} \times n}{\|H_{mn} \times n\|} = \frac{\hat{k}m_y}{\sqrt{m_y^2}}$$

$$H_{mn} \cdot n = \frac{1 - m_x}{\sqrt{(m_x-1)^2 + m_y^2}}$$

-continued $$_m^n Q = (H_{mn} \cdot n) + \left[ R\sqrt{1-(H_{mn}\cdot n)^2} \right] = \frac{(1-m_x) + \hat{k}(m_y)}{\sqrt{(m_x-1)^2 + m_y^2}}$$

If $0 < m_x < 1$, then $\angle mn$ is obtuse:

$$H_{mn'} = \frac{m+n'}{\|m+n'\|} = \frac{\hat{i}(m_x+1) + \hat{j}m_y}{\|\hat{i}(m_x+1) + \hat{j}m_y\|} = \frac{\hat{i}(m_x+1) + \hat{j}m_y}{\sqrt{(m_x+1)^2 + m_y^2}}$$

$$r = \sqrt{1-(H_{mn'}\cdot n')^2} = \sqrt{1 - \frac{(m_x+1)^2}{(m_x+1)^2 + m_y^2}} = \frac{|m_y|}{\sqrt{(m_x+1)^2 + m_y^2}}$$

$$R = \frac{H_{mn'} \times n}{\|H_{mn'} \times n\|} = \frac{\hat{k} m_y}{\sqrt{m_y^2}} = \hat{k}((m_y > 0)?1: -1)$$

$$\hat{i}x + \hat{j}y + \hat{k}z = R\sin\left(\frac{\theta}{2}\right) = R(H_{mn'} \cdot n') = \frac{\hat{k}((m_y > 0)?1: -1)(m_x+1)}{\sqrt{(m_x+1)^2 + m_y^2}}$$

$$_m^n Q =$$

$$\sqrt{1-(H_{mn'}\cdot n')^2} + [R(H_{mn'}\cdot n')] = \frac{|m_y| + \hat{k}((m_y > 0)?1: -1)(m_x+1)}{\sqrt{(m_x+1)^2 + m_y^2}}$$

The gravitational and magnetic quaternions are combined to calculate the complete field quaternion that equals the rotation of the sensor relative to Earth's coordinate system.

$$_E^S Q_f = (_m^n Q_a^S Q_m^n Q')_m^n Q = _m^n Q_a^S Q$$

For any rotation, there exist two possible quaternions that can represent the rotation. They differ by the sign of each element in the quaternion vector. To produce the smoothest possible mathematical transition between time sequential quaternions, the distance between the two possible field quaternions and the previous sample quaternion is calculated, and the field quaternion closest to the previous sample quaternion is selected as the current field quaternion. The two distances are calculated by summing together the absolute values of the difference between each vector element of the current field quaternion candidate and the previous sample quaternion.

$$\text{distance} = \Sigma_{rxyz} |Q_{f,i} - Q_{p,i}|$$

Returning to FIG. 1, the IMU application 116 may calculate the field quaternion by combining a plurality of accelerometer readings to create an average accelerometer reading, and using the average accelerometer reading to calculate an accelerometer quaternion. In another aspect, the IMU application 116 calculates the field quaternion by combining a plurality of magnetometer readings to create an average magnetometer reading, and using the average magnetometer reading to calculate a magnetometer quaternion. For example, the IMU application 116 may select a number of readings in the plurality of magnetometers readings in response to a distance between a current reading and past readings, and the estimated magnetometer jitter.

Returning to FIG. 2C, after completing the field quaternion calculation, processing exits the "Field Quaternion Calculation" block (244) and proceeds to the "Gyroscopic & Field Quaternion Mixing" block (246) to calculate the current sample quaternion for the current input readings. The two quaternions are combined using a weighted average as shown below.

Use the weighted average to calculate final quaternion:

$Q_f = _E^S Q_f =$ field quaternion;

$Q_\omega = _E^S Q_\omega =$ gyroscopic quaternion;

$w_f =$ weight of $Q_f$;

$w_\omega =$ weight of $Q_\omega$;

$w_f + w_\omega = 1$;

$$Q_{f\omega} = \frac{w_f Q_f + w_\omega Q_\omega}{\|w_f Q_f + w_\omega Q_\omega\|}$$

The field quaternion weighting is based upon the estimated accuracy of the field measurements ($\theta_{fe}$), calculated earlier, and the angular distance between the field and gyroscopic quaternions (248). The angular distance between the two quaternions is calculated from the r-element of the quaternion that would rotate one quaternion onto the other.

$$r_{f\omega} = \text{Real}(_f^\omega Q) = \text{Real}(Q_\omega Q_f') = r_\omega r_f + x_\omega x_f + y_\omega y_f + z_\omega z_f$$

$$r_{f\omega} = \cos\left(\frac{\theta_{f\omega}}{2}\right)$$

$$\theta_{f\omega} = 2 \cdot \arcsin\left(\sin\left(\frac{\theta_{f\omega}}{2}\right)\right) = 2 \cdot \arcsin\left(\sqrt{1-\cos^2\left(\frac{\theta_{f\omega}}{2}\right)}\right) =$$

$$2 \cdot \arcsin\left(\sqrt{1-r_{f\omega}^2}\right) \cong 2\sqrt{1-r_{f\omega}^2} \text{ for } \theta_{f\omega} \text{ small}$$

If the angular distance is less than or equal to the field angular error measurement (250), then the gyroscopic quaternion is used as the current sample quaternion (251), because the field quaternion has relatively too much error to be useful.

If ($\theta_{f\omega} \leq f_{fe}$), then Use Gyroscopic Quaternion

If the angular distance is larger than the field angular error measurement, then the gyroscopic and field quaternions are mixed to obtain the current sample quaternion using the following equations to calculate the relative quaternion weights, which favor the field quaternion as its error becomes small relative to the angular distance (252).

$$w_\omega = \frac{\theta_{fe}}{\theta_{f\omega}}$$

$$w_f = 1 - w_\omega$$

Returning to FIG. 1, in one aspect the IMU application 116 low-pass filters four vector elements of the current sample quaternion to provide an output quaternion. Alternatively, the IMU application 116 compares a sum of angular commonality between each current sample quaternion in a group of current sample quaternions, with other current sample quaternions from the group, and selects the current sample quaternion associated with the largest sum as an output quaternion.

Returning to FIG. 2C, after completing the field quaternion calculation, processing exits the "Gyroscopic & Field Quaternion Mixing" block (246) and proceeds to the "Output Quaternion Filter" block (230) to reduce the quaternion sample rate to a rate required by the application. Using a higher quaternion sample rate than the system requires allows the algorithm to track the IMU orientation with more accuracy not limited to the application data rate. The IMU sample rate may be determined by the rate the IMU changes orientation rather than the rate that the application consumes the data.

Many types of filters can be used to perform the down conversion from the sample rate to the output rate. For example, the sample quaternions can be low-pass filtered by filtering all four vector elements in four separate paths of a four input filter. Alternatively, a median filter can be used. The median value of a set of quaternions is calculated by summing the angular commonality between each candidate quaternion and all other candidate quaternions, and selecting the quaternion with the largest total angular commonality.

$$\text{total\_angular\_commonality}(Q_j) = \sum_{i \neq j}^{N} \text{Real}(_i^j Q)$$

Other filters may also be used for the output quaternion filter.

As noted above, the IMU and associated algorithm need not necessarily use a magnetometer. In this case, only the Z-axis orientation is relative to the reference field (e.g., Earth). The X and Y axis orientation are not relative to Earth, and may drift due to gyroscope sensor drift.

Summarizing FIGS. 1 and 2A-2C, it is noted that estimating can be performed when the IMU is relatively still, for the purpose of updating the magnetometer jitter and the accelerometer bias offset estimates. The gyroscope bias estimate can be updated when the gyroscope readings are relatively small to reduce gyroscope drift. The angular error between accelerometer readings and Earth's gravitational field due to sensor inertial motion can also be estimated. Estimations are possible of the angular error between magnetometer readings and Earth's magnetic field due to jitter in magnetometer readings. Further, the combined angular error of the accelerometer and magnetometer readings can be estimated. Advantageously, a stable quaternion can be calculated from two vectors even when the two vectors approach an anti-parallel orientation. It is possible to calculate a stable field quaternion from acceleration and gyroscopic sensors. Gyroscopic and field quaternions are combined using a weighting based upon estimated field quaternion angular error and the angular difference between the gyroscopic and field quaternions, and the quaternion output can be decimated using a quaternion median filter.

Figure 3B:
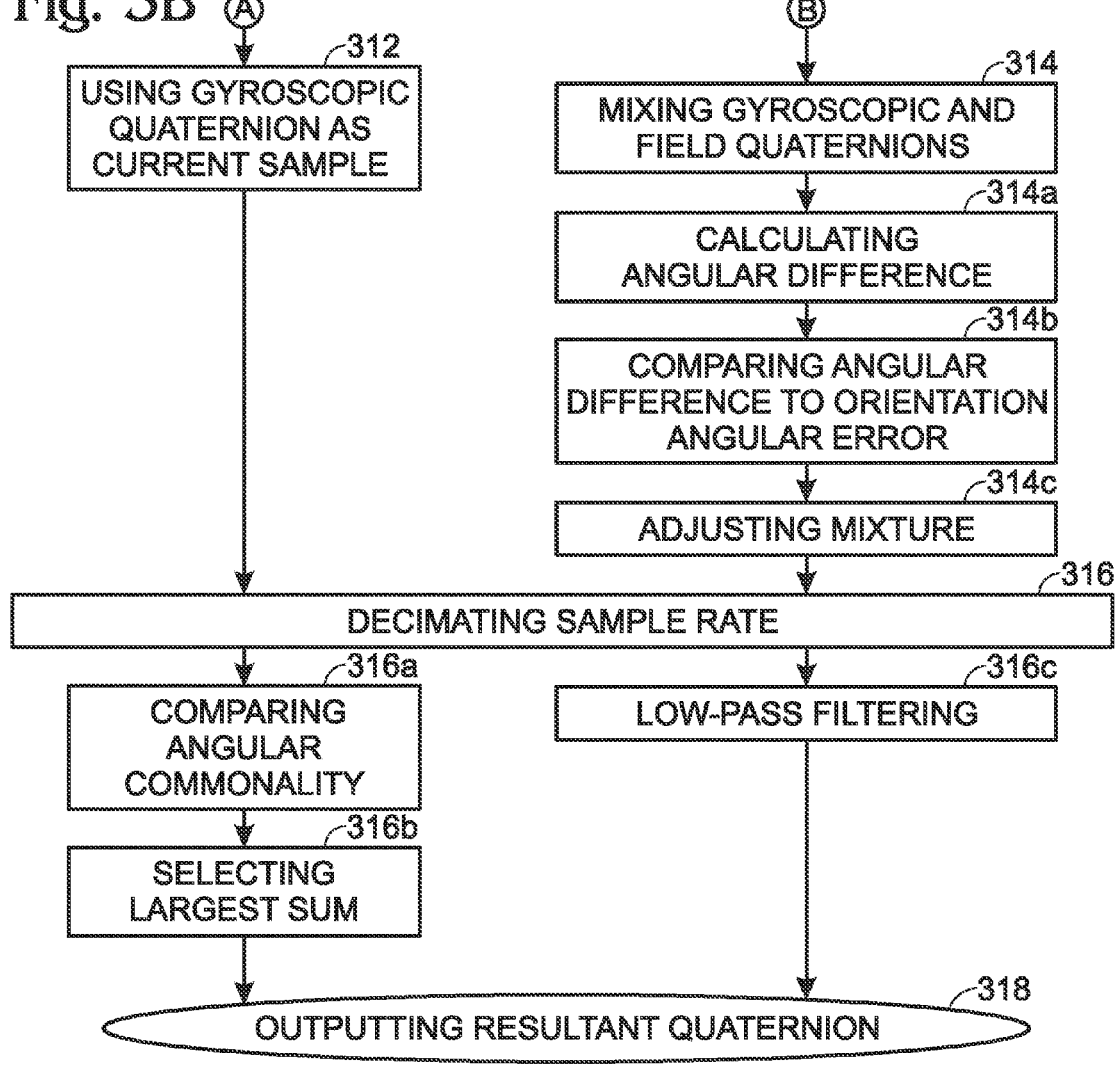

FIGS. 3A and 3B are a flowchart illustrating a summarized method for determining the orientation of an inertial measurement unit. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 300.

Step 306 calculates a gyroscopic quaternion. Step 308 estimates angular orientation errors due to IMU angular velocity and linear acceleration. When an IMU accelerometer reading is about equal to gravity (1 G), Step 310 calculates a field quaternion using IMU accelerometer readings. In one aspect, Step 302 estimates IMU bias and jitter when an IMU is relatively still. Step 304 stores sensor readings in a history buffer for future use. When the accelerometer reading is not about equal to 1 G, Step 312 uses the gyroscopic quaternion as the current sample quaternion. Step 314 uses the angular orientation errors to selectively mix the gyroscopic quaternion and field quaternion to supply a current sample quaternion. Step 316 decimates the current sample rate to the output sample rate. Step 318 outputs the resultant quaternion.

In one aspect, Step 302b estimates IMU gyroscope reading bias and Step 302c estimates IMU accelerometer reading bias in response to determining a lack of IMU movement. In a related aspect, the method optionally estimates IMU magnetometer jitter errors in Step 302a.

In another aspect, Step 306a adjusts the IMU gyroscopic reading to zero, when the gyroscopic reading is near zero, to remove near-zero gyroscope reading jitter. Step 306b calculates the current gyroscopic quaternion from the previous sample quaternion and the adjusted gyroscopic reading.

In another aspect, Step 308 may calculate a total angular orientation error by combining an orientation angular error due to centripetal acceleration and an orientation angular error due to linear acceleration. When the IMU uses a magnetometer, Step 308 may calculate the total angular orientation error by additionally combining an orientation angular error due to estimated IMU magnetometer jitter. Then, Step 310 calculates the field quaternion using the IMU accelerometer readings and IMU magnetometer readings, and Step 314 selectively mixes the gyroscopic quaternion and field quaternion in response to the angular orientation errors and the estimated IMU magnetometer jitter errors.

In one aspect, calculating the field quaternion in Step 310 includes calculating a gravitational quaternion able to rotate an accelerometer reading so that a normalized Z-axis component of the accelerometer reading is equal to 1. Then, calculating the field quaternion may include the following sub-steps. Step 310d uses the gravitational quaternion to rotate a magnetometer reading. Step 310e sets the rotated magnetometer reading's Z-axis component to zero, creating an adjusted magnetometer reading. Step 310f calculates a magnetometer quaternion able to further rotate the adjusted magnetometer reading so that a normalized X-axis component is equal to −1. Step 310g combines the gravitational quaternion and the magnetometer quaternion.

In a different aspect, Step 310 calculates the field quaternion further using the following sub-steps. Step 310a combines a plurality of accelerometer readings to create a combined accelerometer reading, and Step 310b uses the combined accelerometer reading to calculate a gravitational quaternion. For example, the combined plurality of accelerometer readings may create an average accelerometer reading. Likewise, Step 310c may combine a plurality of magnetometer readings to create a combined (e.g., average) magnetometer reading, and Step 310f uses the combined magnetometer reading to calculate a magnetometer quaternion. Further, Step 310c may include selecting a number of readings in the plurality of magnetometers readings in response to a distance (angle) between a current reading and past readings, and the estimated IMU magnetometer jitter.

In one aspect, selectively mixing the gyroscopic quaternion and field quaternion to supply the current sample quaternion in Step 314 includes sub-steps. Step 314a calculates an angular difference between the gyroscopic quaternion and field quaternion. Step 314b compares the angular difference to the total angular orientation error, and Step 314c adjusts the mixture of the gyroscopic quaternion and field quaternion in response to the comparison.

Step 316c low-pass filters four vector elements of the current sample quaternion to provide an output quaternion. Alternatively, Step 316a compares a sum of angular commonalties between each current sample quaternion in a group of current sample quaternions, with other current sample quaternions from the group. Step 316b selects the current sample quaternion associated with the largest sum as an output quaternion.

Figure 4:
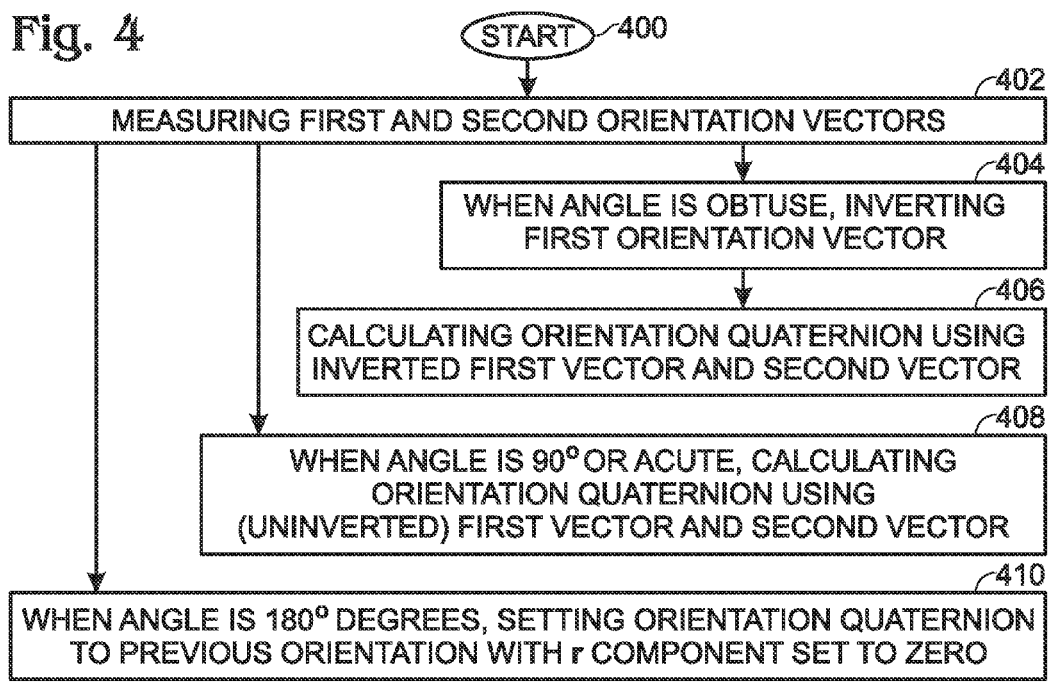
FIG. 4 is a flowchart illustrating a method for an inertial measurement unit to calculate an orientation-related quaternion.

FIG. 4 is a flowchart illustrating a method for an inertial measurement unit to calculate an orientation-related quaternion. The method begins at Step 400. In Step 402 the IMU measures a first orientation-related vector and a second orientation-related vector. When the angle between the first orientation-related vector and the second orientation-related vectors is obtuse, Step 404 inverts the first orientation-related vector. Step 406 calculates an orientation-related quaternion using the inverted first orientation-related vector and the second orientation-related vector. When the angle between the first orientation-related vector and the second orientation vector is 90 degrees or acute, Step 408 calculates the orientation-related quaternion using the first orientation-related vector and second orientation-related vector. When the angle between the first orientation-related vector and the second orientation vector is 180 degrees, Step 410 sets the orientation-related quaternion to a normalized value of a previous orientation-related quaternion with the previous orientation-related quaternion r component set to zero.

An IMU system and method have been provided. Examples of particular process steps and formulas been presented to illustrate the invention. However, the invention is not limited to merely these examples. Other variations and embodiments of the invention will occur to those skilled in the art.

I claim:

1. An inertial measurement unit (IMU) comprising:
   a gyroscope having an output to supply gyroscopic readings;
   an accelerometer having an output to supply accelerometer readings;
   a processor,
   a non-transitory memory;
   an IMU application residing in the non-transitory memory, comprising a sequence of processor executable instructions for calculating a gyroscopic quaternion in response to gyroscopic readings, calculating a field quaternion using accelerometer readings when an accelerometer reading is about equal to gravity (1 G), estimating angular orientation errors due to IMU angular velocity and linear acceleration, and using the angular orientation errors to selectively mix the gyroscopic quaternion and field quaternion to supply a current sample quaternion: and,
   an IMU interface to supply a current IMU orientation in space, responsive to the current sample quaternion.

2. The IMU of claim 1 further comprising:
   a magnetometer having an output to supply magnetometer readings; and,
   wherein the IMU application estimates magnetometer jitter errors in response to magnetometer readings, calculates the field quaternion using the accelerometer readings and magnetometer readings, and selectively mixes the gyroscopic quaternion and field quaternion includes in response to the angular orientation errors and the estimated magnetometer jitter errors.

3. The IMU of claim 2 wherein the IMU application estimates the IMU magnetometer jitters errors, and calibrates the gyroscope readings and accelerometer readings in response to determining a lack of IMU movement.

4. The IMU of claim 1 wherein the IMU application uses the gyroscopic quaternion as the current sample quaternion when the accelerometer reading is not about equal to 1 G.

5. The IMU of claim 1 wherein the IMU application, prior to calculating the field quaternion, calculates a total angular orientation error by combining an orientation angular error due to centripetal acceleration, an orientation angular error due to linear acceleration, and an orientation angular error due to estimated magnetometer jitter.

6. The IMU of claim 5 wherein the IMU application calculates an angular difference between the gyroscopic quaternion and field quaternion, compares the angular difference to the total angular orientation error, and selectively mixes the gyroscopic quaternion and field quaternion in response to the comparison.

7. The IMU of claim 1 wherein the IMU application calculates the field quaternion by:
   calculating a gravitational quaternion able to rotate an accelerometer reading so that a normalized Z-axis component of the accelerometer reading is equal to 1;
   using the gravitational quaternion to rotate a magnetometer reading;
   setting the rotated magnetometer reading's Z-axis component to zero, creating an adjusted magnetometer reading;
   calculating a magnetometer quaternion able to further rotate the adjusted magnetometer reading so that a normalized X-axis component is equal to −1; and,
   combining the gravitational quaternion and the magnetometer quaternion.

8. The IMU of claim 7 wherein the IMU application calculates the field quaternion by combining a plurality of accelerometer readings to create an average accelerometer reading, and using the average accelerometer reading to calculate an accelerometer quaternion.

9. The IMU of claim 7 wherein the IMU application calculates the field quaternion by combining a plurality of magnetometer readings to create an average magnetometer reading, and using the average magnetometer reading to calculate a magnetometer quaternion.

10. The IMU of claim 9 wherein the IMU application selects a number of readings in the plurality of magnetometers readings in response to a distance between a current reading and past readings, and an estimated magnetometer jitter.

11. The IMU of claim 1 wherein the IMU application low-pass filters four vector elements of the current sample quaternion to provide an output quaternion.

12. The IMU of claim 1 wherein the IMU application compares a sum of angular commonalties between each current sample quaternion in a group of current sample quaternions, with other current sample quaternions from the group, and selects the current sample quaternion associated with the largest sum as an output quaternion.

13. An inertial measurement unit (IMU) comprising:
   a gyroscope having an output to supply gyroscopic readings;
   an accelerometer having an output to supply accelerometer readings;
   a processor,
   a non-transitory memory;
   an IMU application residing in the non-transitory memory, comprising a sequence of processor executable instructions for calculating a gyroscopic quaternion in response to gyroscopic readings, calculating a field quaternion using accelerometer readings when an accelerometer reading is about equal to gravity (1 G), estimating angular orientation errors due to IMU angular velocity and linear acceleration, and using a field quaternion estimate error and the angular distance between the gyroscope quaternion and field quaternion to relatively weight the gyroscope quaternion and field quaternion used to form a current sample quaternion; and, an IMU interface to supply a current IMU orientation in space, responsive to the current sample quaternion.

* * * * *